US009870633B2

(12) United States Patent
Kraft et al.

(10) Patent No.: US 9,870,633 B2
(45) Date of Patent: Jan. 16, 2018

(54) AUTOMATED HIGHLIGHTING OF IDENTIFIED TEXT

(71) Applicant: A9.com, Inc., Palo Alto, CA (US)

(72) Inventors: Adam Wiggen Kraft, Mountain View, CA (US); Arnab Sanat Kumar Dhua, Mountain View, CA (US); Douglas Ryan Gray, Mountain View, CA (US); Xiaofan Lin, Palo Alto, CA (US); Yu Lou, Stanford, CA (US); Sunil Ramesh, San Jose, CA (US); Colin Jon Taylor, Orinda, CA (US); David Creighton Mott, Los Altos, CA (US)

(73) Assignee: A9.COM, INC., Palo Alto, CA (US)

( * ) Notice: Subject to any disclaimer, the term of this patent is extended or adjusted under 35 U.S.C. 154(b) by 0 days.

(21) Appl. No.: 15/387,219

(22) Filed: Dec. 21, 2016

(65) Prior Publication Data

US 2017/0103560 A1    Apr. 13, 2017

Related U.S. Application Data

(63) Continuation of application No. 14/037,275, filed on Sep. 25, 2013, now Pat. No. 9,582,913.

(51) Int. Cl.
*G06T 11/60* (2006.01)
*G06T 19/00* (2011.01)
*G06K 9/00* (2006.01)

(52) U.S. Cl.
CPC .......... *G06T 11/60* (2013.01); *G06K 9/00577* (2013.01); *G06T 19/006* (2013.01)

(58) Field of Classification Search
None
See application file for complete search history.

(56) References Cited

U.S. PATENT DOCUMENTS

| 7,114,126 | B2 | 9/2006 | Berger et al. |
| 8,402,389 | B2* | 3/2013 | Nagasaka ........... G06F 3/04817 709/223 |
| 8,494,507 | B1 | 7/2013 | Tedesco et al. |
| 2004/0080532 | A1* | 4/2004 | Cragun ............. G06F 17/30716 715/745 |
| 2004/0205628 | A1* | 10/2004 | Rosenholtz ........... G06F 3/0481 715/229 |
| 2009/0182548 | A1 | 7/2009 | Zwolinski |
| 2009/0193352 | A1 | 7/2009 | Bunn |

(Continued)

OTHER PUBLICATIONS

Non-Final Office Action issued in U.S. Appl. No. 14/037,275 dated Sep. 10, 2015.

(Continued)

*Primary Examiner* — Andrew G Yang
(74) *Attorney, Agent, or Firm* — Hogan Lovells US LLP (57) ABSTRACT

Various embodiments enable a computing device to perform tasks such as highlighting words in an augmented reality view that are important to a user. For example, word lists can be generated and the user, by pointing a camera of a computing device at a volume of text, can cause words from the word list within the volume of text to be highlighted in a live field of view of the camera displayed thereon. Accordingly, users can quickly identify textual information that is meaningful to them in an Augmented Reality view to aid the user in sifting through real-world text.

20 Claims, 9 Drawing Sheets

(56) References Cited

U.S. PATENT DOCUMENTS

| | | |
|---|---|---|
| 2010/0218096 A1* | 8/2010 | Martin ................ G06F 17/3002 |
| | | 715/716 |
| 2010/0312624 A1 | 12/2010 | Bilenko |
| 2011/0119258 A1 | 5/2011 | Forutanpour et al. |
| 2012/0088543 A1 | 4/2012 | Lindner et al. |
| 2012/0159336 A1 | 6/2012 | Norwood |
| 2012/0204123 A1 | 8/2012 | Bauer et al. |
| 2012/0254716 A1* | 10/2012 | Choi .................... H04N 21/475 |
| | | 715/230 |
| 2013/0085345 A1* | 4/2013 | Geisner ................. G06Q 30/00 |
| | | 600/300 |
| 2014/0088856 A1* | 3/2014 | Wouhaybi ........... G06F 17/3087 |
| | | 701/118 |

OTHER PUBLICATIONS

Final Office Action issued in U.S. Appl. No. 14/037,275 dated Feb. 22, 2016.
Non-Final Office Action issued in U.S. Appl. No. 14/037,275 dated Jun. 9, 2016.
Notice of Allowance issued in U.S. Appl. No. 14/037,275 dated Oct. 28, 2016.

\* cited by examiner

AUTOMATED HIGHLIGHTING OF IDENTIFIED TEXT

CROSS REFERENCE TO RELATED APPLICATION

This application is a Continuation of, and accordingly claims the benefit of U.S. patent application Ser. No. 14/037,275 filed with the U.S. Patent and Trademark Office on Sep. 25, 2013, which is hereby incorporated herein by reference.

BACKGROUND

As people are increasingly utilizing a variety of computing devices, including portable devices such as tablet computers and smart phones, it can be advantageous to adapt the ways in which people interact with these devices. Users are accustomed to manually typing words into a search field to search for words in a webpage or document in order to highlight the same. Such a task is not available for printed text sources, thereby requiring users to read through or scan all text in the document in order to find or identify desired words within a document, for example.

Augmented reality (AR) and visual search applications that display a live view of a physical real-world environment augmented by computer-generated sensory input, have become more popular with adoption of smartphones and other portable computing devices. Through computer vision algorithms, some of these applications are able to provide users with information related to an environment in both a search and gaming context, thus, enabling users to interact with aspects of the environment that were previously unavailable. As technology evolves and as the features and services offered on portable computing devices evolve and expand, the ways in which word searching of printed text sources is changing.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the foregoing or other deficiencies experienced in conventional approaches to providing users with information via a computing device. In particular, various embodiments enable a computing device to perform tasks such as highlighting words, in an augmented reality view, that have been identified as being important or otherwise of certain meaning to a user. For example, one or more word lists can be generated (e.g., by a user, a group of users, or a service provider based on subject matter) and the user, by pointing a camera of a computing device at a volume of text, can cause words from the word list within the volume of text to be highlighted in a live field of view of the camera displayed thereon. Accordingly, users can quickly identify information, such as may be represented by words in a word list, in text in the real-world that is meaningful to them in an Augmented Reality (AR) view to aid the user in sifting through real-world text. Such an approach can be useful for large bodies of text, for example, as a computer often is much quicker at sifting through a large volume of text relative to a human.

In at least one embodiment, a computing device, capturing image information of a volume of text with a camera, displays at least a portion of the same that corresponds to a live camera field of view or a real-time video captured by the camera. In this example, the volume of text is recognized using an optical character recognition (OCR) engine and words provided by a user, such as words in a defined list, are compared to the recognized text. Upon identifying a word provided by the user in the recognized text, a graphical overlay can be displayed in the live camera field of view above or adjacent the identified word, which includes a visual attribute causing the identified word to stand out relative to the remainder the volume of text, thereby enabling the user to quickly identify information important to them.

Various other functions and advantages are described and suggested below as may be provided in accordance with the various embodiments.

Figure 1A:
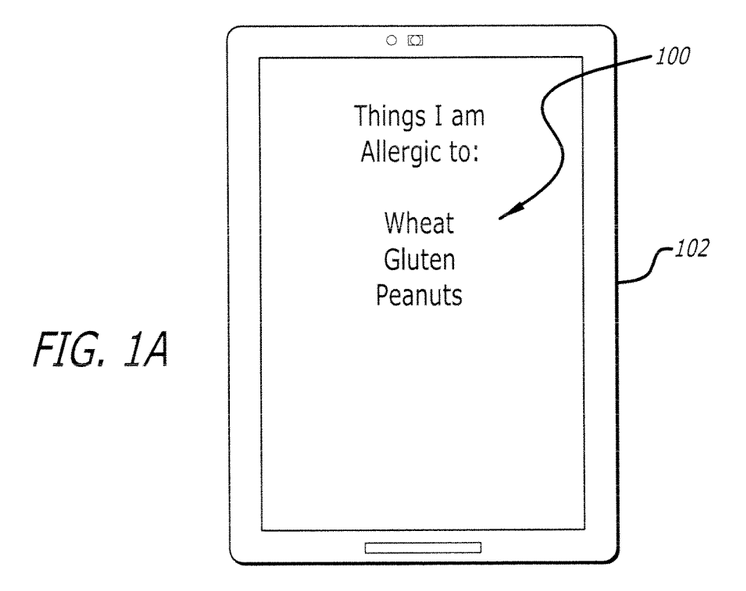
FIG. 1A illustrates an example word list provided by a user in accordance with at least one embodiment.
Figure 1B:
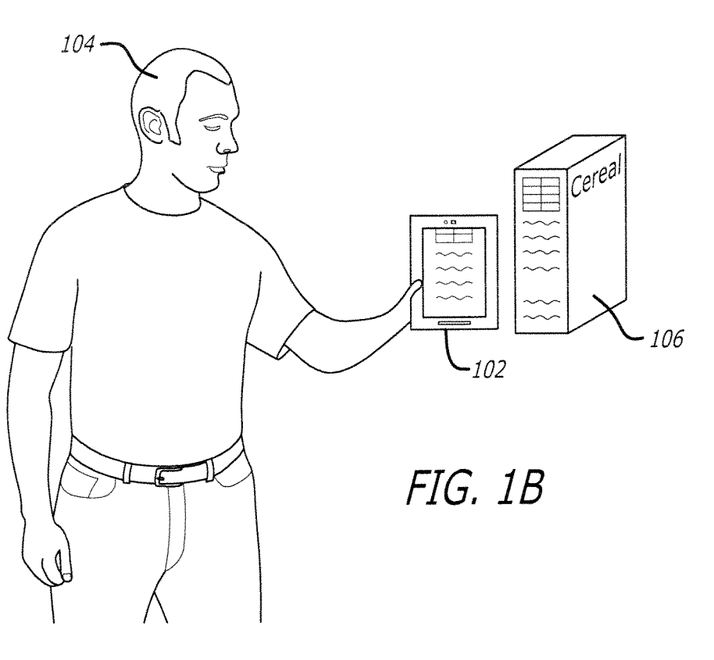
FIG. 1B illustrates an example of a user highlighting words from the word list of FIG. 1A in accordance with at least one embodiment.

FIGS. 1A-1B illustrate example word list 100 being displayed on computing device 102 and which is subsequently used by user 104 to scan ingredients of cereal box 106 in accordance with at least one embodiment. Although a portable computing device (e.g., a smart phone, an electronic book reader, or tablet computer) is shown, it should be understood that various other types of electronic device that are capable of determining and processing input can be used in accordance with various embodiments discussed herein. These devices can include, for example, notebook computers, personal data assistants, video gaming consoles or controllers, and portable media players, among others.

In this and various examples, user 104 can manual create and edit multiple lists of words that user 104 would like to have standout from or be highlighted within a body of text. FIG. 1A shows computing device 102 displaying word list 100 for food items that cause user 104 allegories. Accordingly, in this example, user 104 is allergic to wheat, items that contain gluten, and peanuts and has added these items to word list 100. After adding these items, user 104 can then scan the ingredients listed on cereal box 106 to detect if any of the listed food items (or other food items containing one of these listed items) is present within the text printed thereon. As shown in FIG. 1B, user 104 is pointing computing device 102 at cereal box 106 and a live camera field of view of cereal box 106 is shown displayed on the display screen of computing device 102.

Figures 2A, 2B:
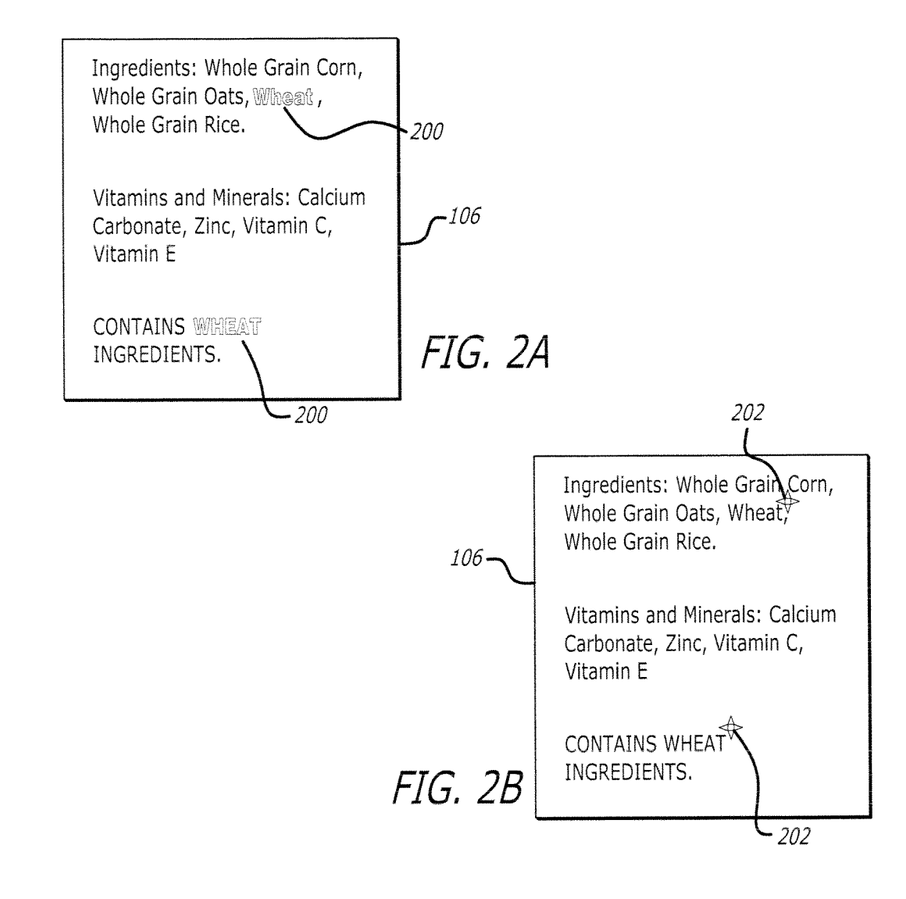
FIGS. 2A-2C illustrates a few example highlighting techniques in accordance with at least one embodiment.
Figure 2C:
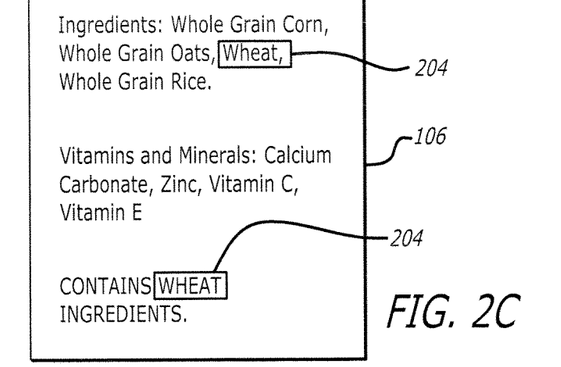

FIGS. 2A-2C illustrate example highlighting techniques for words displayed on computing device 102 in accordance with at least one embodiment. FIG. 2A shows one example highlighting technique which includes traced word 200 in a graphical overlay above the original word in the text. In this example, cereal box 106 includes "wheat," which user 104 is allegoric to, as an ingredient. Accordingly, in this example, the word "wheat" in the live camera field of view has been covered by overwriting the word with traced word 200 which can be an overlay of the word "wheat" displayed in a different color or font compared to the remainder of the text on cereal box 106. FIG. 2B shows another example highlighting technique which includes graphical identifier 202 adjacent the word "wheat." In this example, graphical identifier 202 can be a star, a colored dot, an asterisk, or any other like shape that may draw the user's attention. FIG. 2C shows another example highlighting technique which includes bounding box 204 around the word "wheat." Accordingly, bounding box 204 can be provided in color that causes the word "wheat" to pop out relative to the remainder of the text on cereal box 106.

Each of these examples shows a snapshot of a real-time image of cereal box 106, such as a frame in a video or from a live camera field of view of computing device 102. Accordingly, as user 104 moves computing device 102 (i.e., changes the camera field of view), the displayed location of the words on the display screen of computing device 102 will change and traced word 200, graphical identifier 202, and bounding box 204 can move in corresponding movement with a respective word in real-time. Further, traced word 200, graphical identifier 202, and bounding box 204 can be displayed in different colors, different traced fonts, different outlines, or can utilize other visual designs for different purposes. Other mechanisms can also be used to alert users of an identified word, such as using an audible sound or tactile vibration of computing device 102 and the like.

Figure 3A:
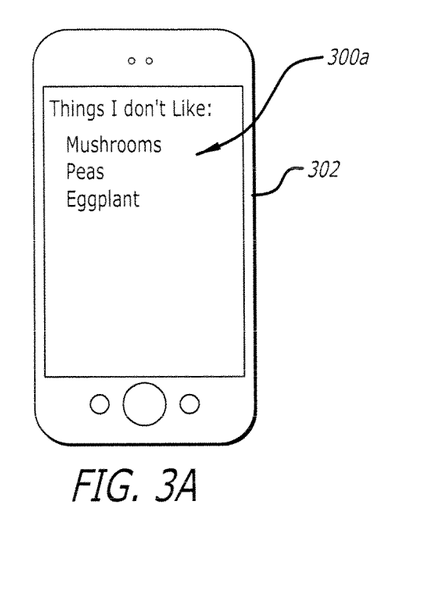
FIGS. 3A-3B illustrates example word lists provided by a user in accordance with at least one embodiment.
Figure 3B:
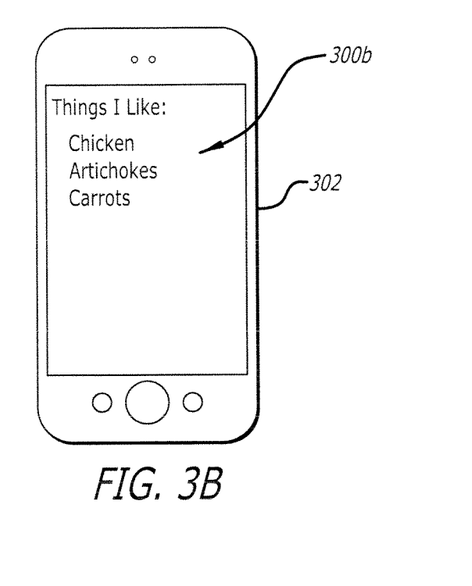
Figure 3C:
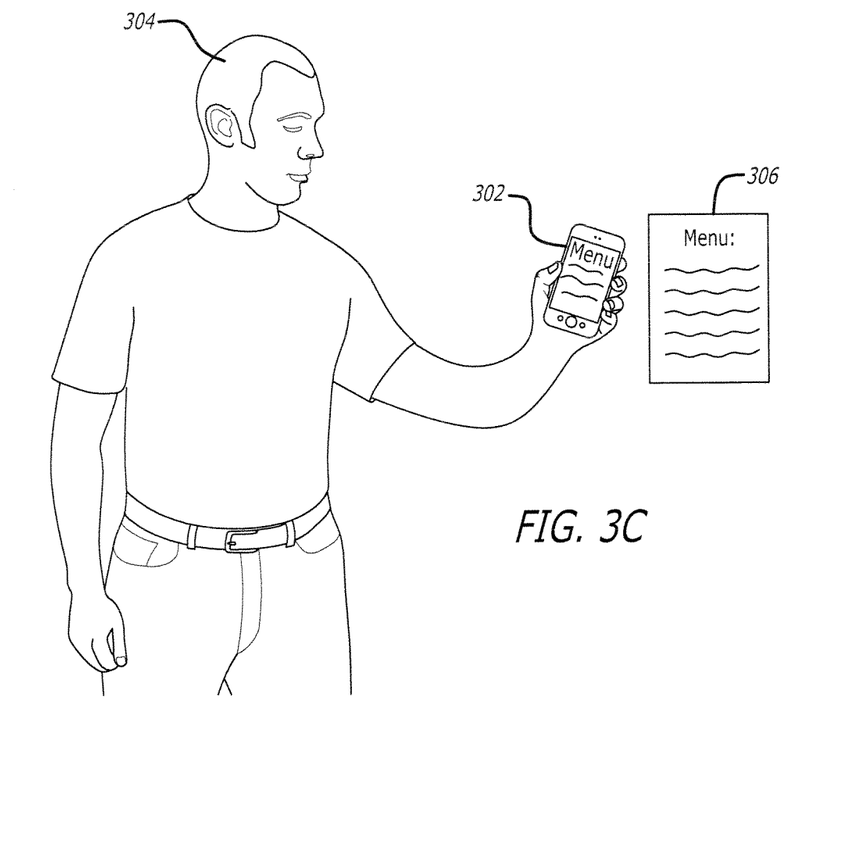
FIG. 3C illustrates another example of a user highlighting words from the word list of FIGS. 3A-3B in accordance with at least one embodiment.

FIGS. 3A-3C illustrate example dislike list 300a and like list 300b being displayed on computing device 302 and which is subsequently used by user 304 to scan food items on menu 306 in accordance with at least one embodiment. In this example, user 304 has created two lists, dislike list 300a for food items they do not like (i.e., mushrooms, peas, eggplant) and like list 300b for food items they do like or prefer (i.e., chicken, artichokes, carrots). In this example, user 304 can assign different highlighting techniques to each list in order to quickly identify words, but also to distinguish between words of the two lists. For example, user 304 could assign items listed in dislike list 300a as red and items listed in like list 300b as green. So, mushrooms, peas, and eggplant can be bound by a red bounding box while chicken, artichokes, and carrots are bound by a green bounding box.

As shown in FIG. 3C, user 304 can scan menu 306 with computing device 302 in order to quickly identify food items user 304 both prefers and wishes to avoid. In this example, user 304 is pointing computing device 302 at menu 306 and a live camera field of view of menu 306 is shown displayed on the display screen of computing device 302. Accordingly, FIGS. 4A-4C illustrate example highlighting techniques, layers, or markers for words and/or larger blocks of text, such as sentences or paragraphs, displayed on computing device 302 in accordance with at least one embodiment.

Figure 4A:
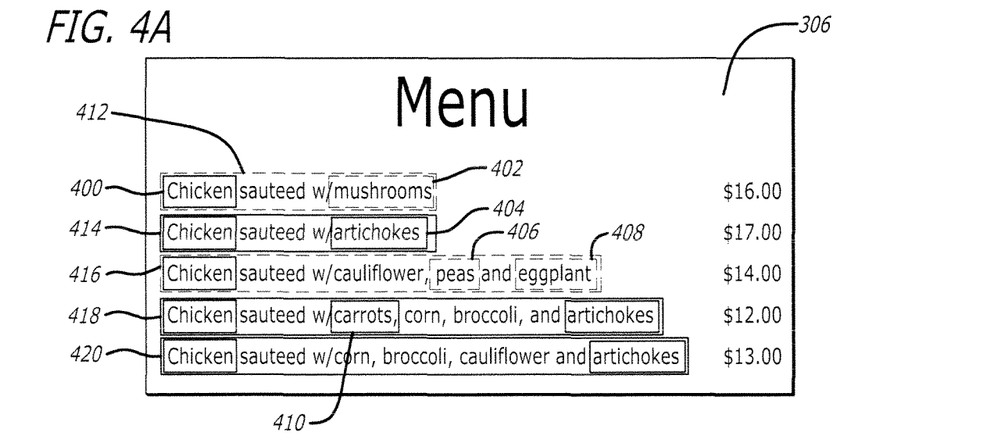
FIGS. 4A-4C illustrates a few example highlighting techniques in accordance with at least one embodiment.

FIG. 4A illustrates an example text highlighting techniques that can be used in accordance with at least one embodiment. In this example, a broken or dashed line bounding box around a single item corresponds to an item in user 304's dislike list 300a and a solid line bounding box around a single food item corresponds to an item on 304's like list 300b. Further, a solid line bounding box around a dish on menu 306 corresponds to a dish that includes ingredients that the user would like or contains items on user 304's like list 300b and no items on user 304's dislike list 300a and a dashed line bounding box around a dish corresponds to a dish that includes ingredients that the user would not like or contains items on user 304's dislike list 300a. Accordingly, bounding box 400, which is a solid line bounding box around "chicken," an item in user 304's like list 300b; bounding box 402, which is a broken line bounding box around "mushrooms," an item in user 304's dislike list 300a; bounding box 404, which is a solid line bounding box around "artichokes," an item in user 304's like list 300b; bounding box 406, which is a dashed line bounding box around "peas," an item in user 304's dislike list 300a; bounding box 408, which is a dashed line bounding box around "eggplant," an item in user 304's dislike list 300a; and bounding box 410, which is a solid line bounding box around "carrots," an item in user 304's like list 300b.

Further, bounding box 412 surrounds a dish containing "chicken," and "artichokes." Since "artichokes" is an item on user 304's dislike list 300a, bounding box 412 is a dashed line bounding box. Similarly, bounding box 416 is a dashed line bounding box for containing "peas," and "eggplant." Bounding boxes 414, 418, and 420 only include items on user 304's like list 300b and, thus, have a solid bounding box around the same, indicating that user 304 may be interested in those items. Accordingly, user 304, by creating dislike list 300a and like list 300b can quickly sift through and weed-out menu items that they would either not like, be allergic to, and the like and also identify dishes that may be of particular interest given a concentration of items on like list 300b. Further, the lines of bounding boxes for respective lists may be different (i.e., dashed or solid) or the bounding box lines can also both be solid, but different colors. For example, dishes user 304 will not like for containing an item on dislike list 300a could be colored red and dishes that user 304 will like could be colored green.

Figure 4B:
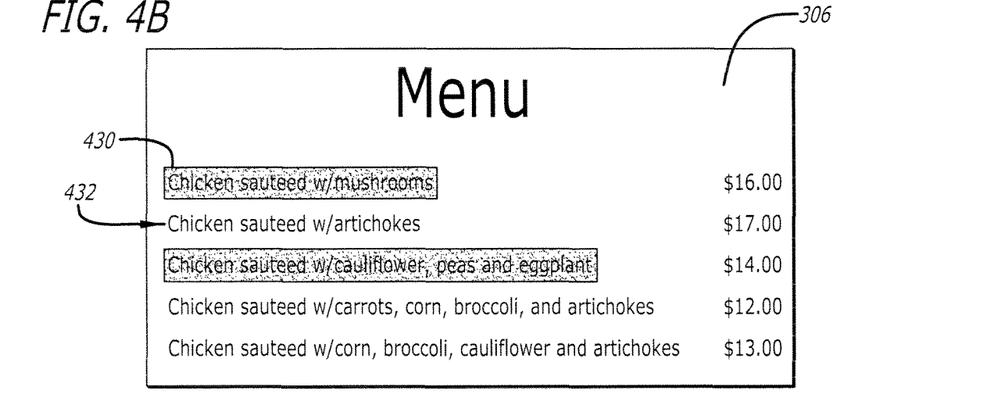
Figure 4C:
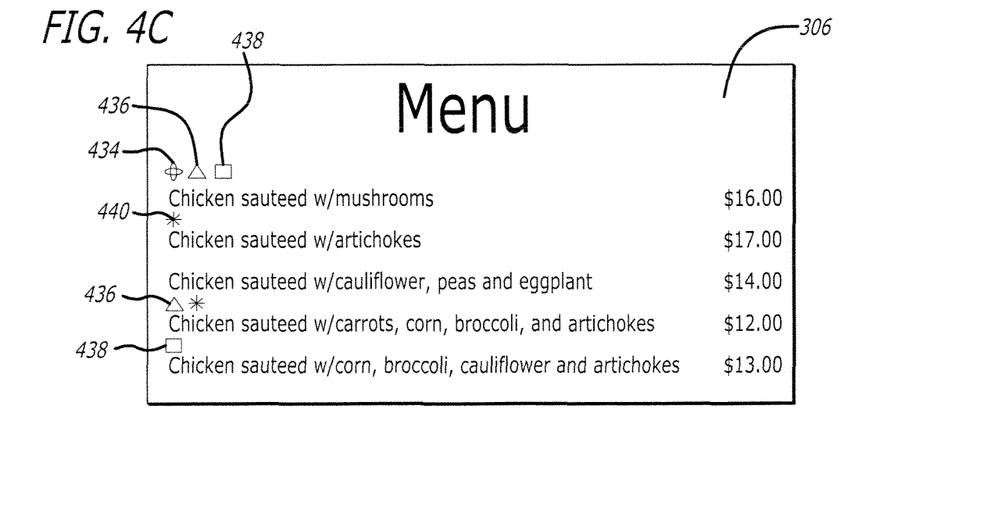

FIG. 4B illustrates another example text highlighting techniques that can be used in accordance with at least one embodiment. In this example, dislike list 300a can be used to partially obscure text of dishes of menu 306 which contain one or more items contain therein. In this example, the first and third dishes have been shaded 430 for containing an item appearing in dislike list 300a. By contract, the second dish, which contains no items present in dislike list 300a, contains no shading 432. Accordingly, in this example, dishes that the user will not like are shaded out to enable user 304 to quickly focus on dishes they would be most likely to enjoy. Further, larger bodies of text can also be highlighted in methods such as overwriting text, drawing bounding boxes, or drawing other markers. With many potential textual layers, the user can pick and choose which to show.

FIG. 4C illustrates another example text highlighting techniques that can be used in accordance with at least one embodiment. In this example, a parent could input food allergies and/or preferences for each member of their family. Accordingly, when user 304 scans menu 306 with computing device 302, each family members respective preferences can be displayed in a way that distinguishes items that one family member would like/dislike from those of other family members. As above, user 304, in this example, is pointing computing device 302 at menu 306 and a live camera field of view of menu 306 is shown displayed on the display screen of computing device 302. In this example, markers (434, 436, 438, 440) are shown displayed in an overlay adjacent menu items where each marker corresponds to a dish or menu item that a respective family member would likely prefer based on their stated preferences. Accordingly, in this example, marker 434 could represent Moms preferences, marker 436 could represent a first child's preferences, marker 438 could represent a second child's preferences, and marker 440 could represent Dads preferences. In this example, Mom and the first and second child would likely all enjoy the chicken sautéed with mushrooms and dad is the only family member who would likely enjoy the chicken sautéed with artichokes.

Further, instead of markers or symbols, each family could be represented as a different color. For example, red could represent Moms preferences, green could represent a first child's preferences, blue could represent a second child's preferences, and yellow could represent Dads preferences. The words or sentences could be colored using a bounding box around a word, highlighting over a word(s), word tracing, and the like. In both of these examples, user 304 would be able to quickly identify menu items that their family would be most likely to prefer. For example, if Dad was picking up take-out on his way home from work, he could scan menu 306 with computing device 302 to quickly rule out unacceptable dishes and quickly hone in on dishes each family member would likely prefer without having consult them.

Figure 5A:
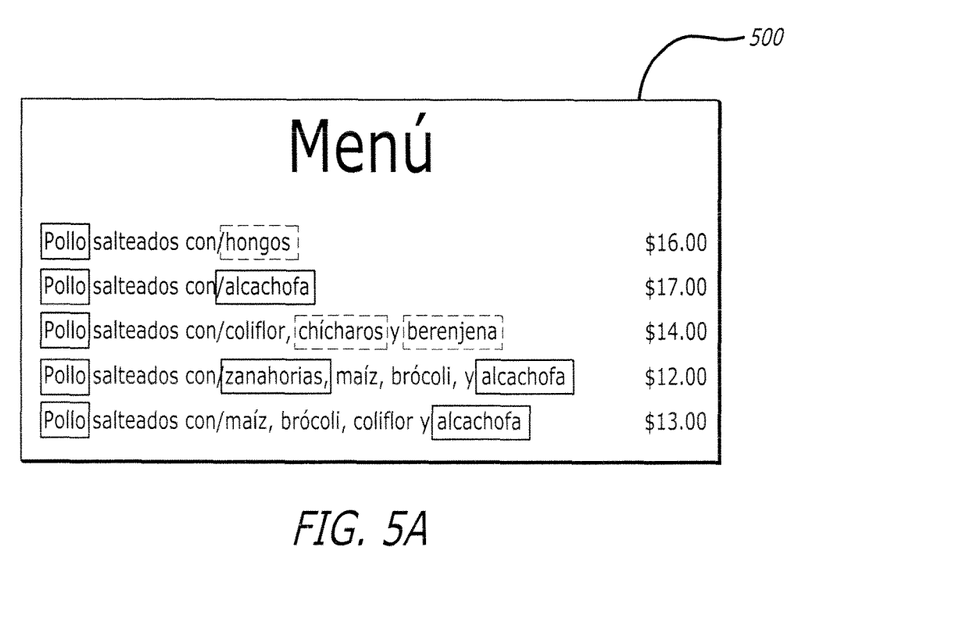
FIGS. 5A and 5B illustrate another example highlighting technique in accordance with at least one embodiment.
Figure 5B:
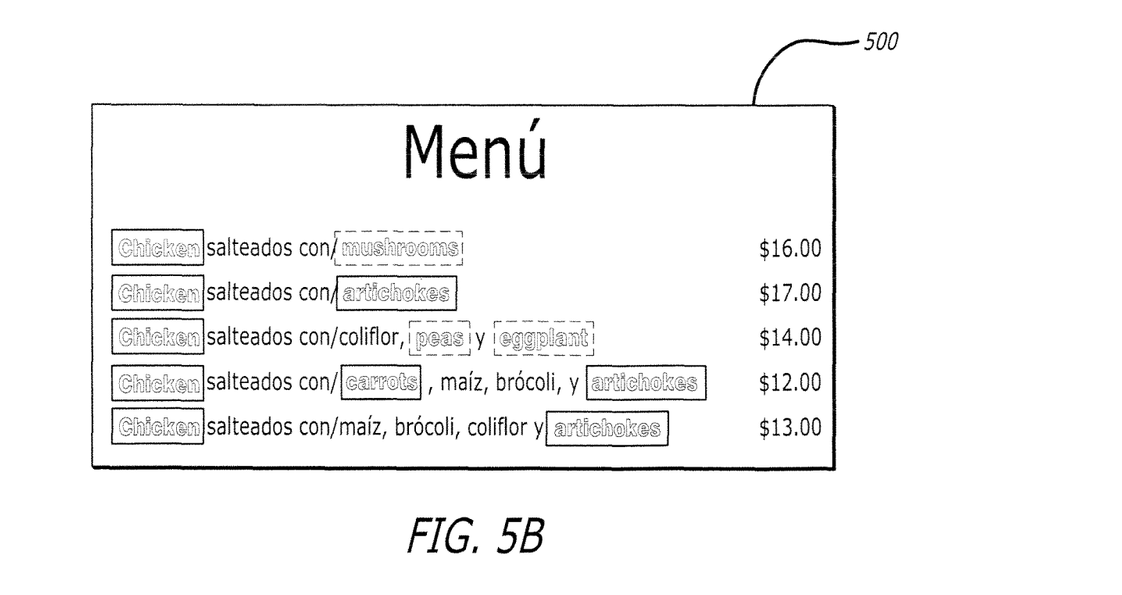

FIGS. 5A and 5B illustrate another example text highlighting techniques that can be used in accordance with at least one embodiment. In at least one embodiment language translation can be used in conjunction with at least some of the techniques described above. For example, translation can be used for individual word lists, so that a user can create or use lists in their native language, but scan text in another language. In this example, user 304 is scanning menu 500 which is in Spanish. Upon identifying the language as Spanish and knowing that user 304's native language is English, the text of menu can be translated and compared to dislike list 300a and like list 300b from FIGS. 3A-3B. Alternatively, upon identifying the language of menu 500 as Spanish, dislike list 300a and like list 300b can be translated and compared to the text of menu 500. Accordingly, once the items from each list are identified, any of the text highlight techniques described above can be applied thereto. Accordingly, a user can enter a list of words in one language, as well as a target translation language. In one example, when the user scans text in the target translation language, any words translated from the list will be highlighted, as shown in FIG. 5A. For example, a user can enter "chicken", "ham", and target translation language as Spanish. Then if they scan over "pollo" or "jamón" in the real-world, those words will be highlighted. Further, the target language can also be determined from analyzing the text results from OCR engine. Further, translation can be performed at a higher level, such as at the sentence or paragraph level, where context of other words is taken into account. In this example, the source-language, which the user scans, can be interpreted from user input or from analyzing OCR results of the same. In a second example, FIG. 5B illustrates menu 500 that has been translated from Spanish to English and the English version of, in this example, words from dislike list 300a and like list 300b is displayed in an overlay hovering above or over a respective Spanish word.

Figure 6A:
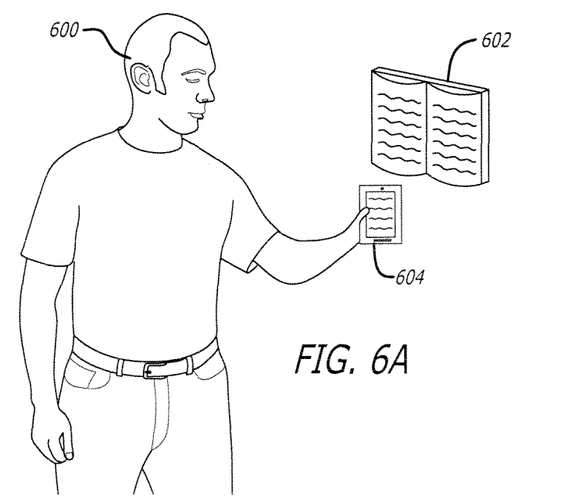
FIGS. 6A-6C illustrate another example highlighting technique in accordance with at least one embodiment.
Figure 6B:
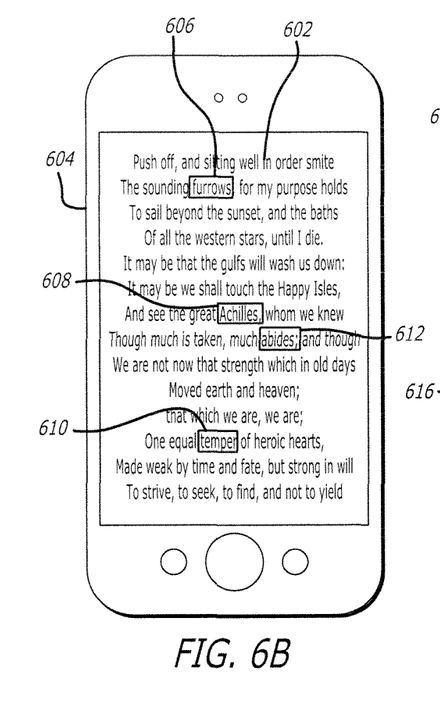
Figure 6C:
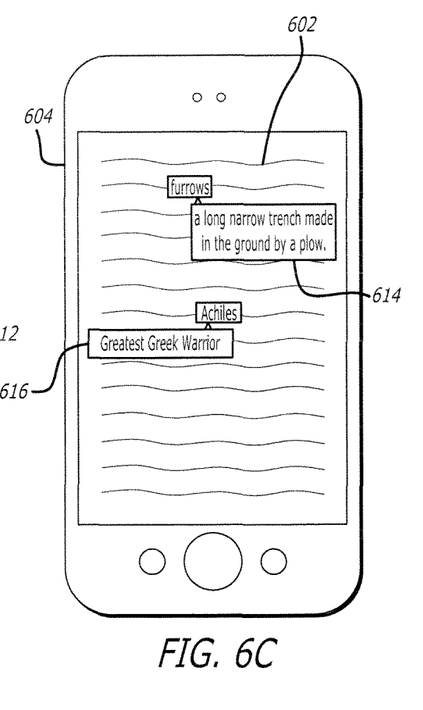

FIGS. 6A-6C illustrate another example highlighting technique for words displayed on computing device 604 in accordance with at least one embodiment. FIG. 6A shows user 600 scanning text of a poem in book 602 with computing device 604. In this example, words in the text of the book can be scanned and recognized using an optical character recognition (OCR) engine. The recognized text can be compared to a database of words to determine if there is additional information, such as a wiki entry or definition, available for a word. If additional information is available for one or more words, a highlighting overlay can be applied to those words to alert user 600 of the additional information. User 600 can then choose to select the highlight or overlay to display the additional information. As shown in FIG. 6B, bounding boxes are rendered around select words (606, 608, 610, 612) within the poem that contain additional information. In this example, user 600 has selected select word 606 "abides" and select word 608 "Achilles" and additional information for these select words has been displayed to user 600, as shown in FIG. 6C. Accordingly, upon selecting "abides," overlay 614 containing a definition for furrows is displayed and, upon selecting "Achilles," overlay 616 containing a wiki definition or explanation of who "Achilles" was in history is displayed over a portion of the poem. In this example, words that are commonly misspelled, not commonly known or printed, historical figures, words from the Graduate Records Exam (GRE), and the like can be highlighted for users. Other types of additional information can also be displayed within the scope of various embodiments.

Figure 7:
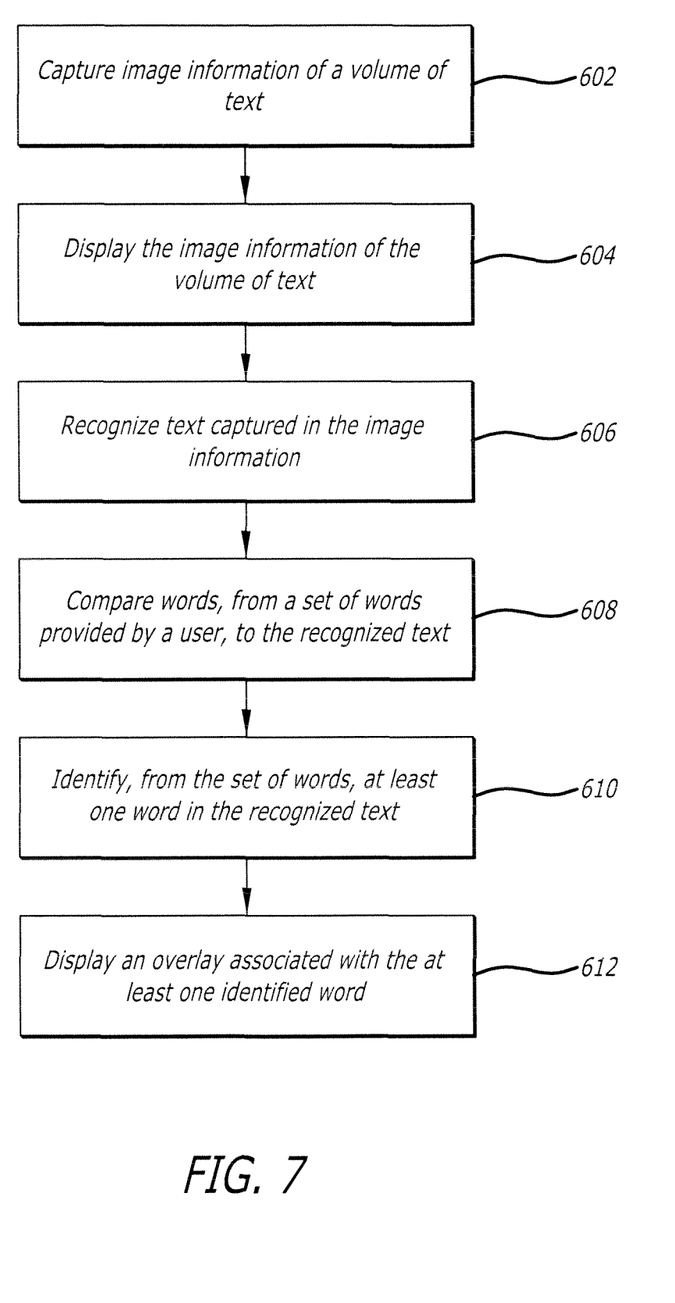
FIG. 7 illustrates an example process for highlighting words from a word list that can be used in accordance with at least one embodiment.

FIG. 7 illustrates an example process 700 for displaying mapping information that can be used in accordance with various embodiments. It should be understood that, for this and other processes discussed herein, there can be additional, fewer, or alternative steps, performed in similar or alternative steps, or in parallel, within the scope of the various embodiments unless otherwise stated. In this example, image information of a volume of text is captured by a computing device 702. In this example, the image information of the volume of text is displayed on a display screen of the computing device 704. In this example, the image information corresponds to a live camera field of view of the computing device such that as a user moves computing device (i.e., changes the camera field of view), the displayed location of the words on the display screen change. In this example, text captured in the image information is recognized using an optical character recognition (OCR) engine 706. In this example, terms or words, from a set of words or list provided by a user are compared to the recognized text 708. In this example, words from the set of words in the recognized text are identified 710. Accordingly, an overlay associated with the identified words is displayed above or adjacent the same 712. Various text treatments can be applied to highlighted words, such as displaying a halo above a word, causing the word to vibrate or appear fuzzy, the word could be reprinted in a bright color, the color of the word could continually change, and the like. Various other types of highlighting, visual information, and presentation methods can be utilized as well within the scope of the various embodiments.

Further, the computing device (or a service provider in communication therewith) can maintain different lists of words in addition to the set of words or list provided by the user for different subject matter. In one example, the lists can be pre-defined, such as lists of nuts for allergies, lists of brand names for shopping, or lists of non-vegetarian ingredients. Further, these lists can be crowd-sourced where users together can create and edit public lists, such as eco-friendly brands, healthy ingredients, or popular science fiction book titles. Lists could be generated for a smaller audience, such as restaurant names in a particular city or geographic region. Further, the user can also specify in what way to highlight each list, for example choosing different colors for multiple different lists. In at least one example, the user can have multiple lists, which can each be highlighted differently. For example, a user can have a list of positive words, which they choose to highlight in green, and another list of negative words they choose to highlight in a different color, such as red.

Accordingly, the computing device, or system in communication therewith, can determine a category of the recognized text and automatically compare a particular word list for the determined category. For example, based on the recognized text, the computing device can determine that the text is associated with a menu and apply a user's food preferences or allegory information. In another example, a user could have a list associated with their favorite sports teams and players. Accordingly, upon scanning an article using the teachings herein, the category of the article can be determined or identified as a sports article and the user's favorite sports teams and players list can be applied thereto.

In one example, as discussed above, a user can generate two lists—one list for desired food ingredients, and another list for unwanted food ingredients. Upon scanning a volume of text, the desired ingredients can be highlighted by one color, such as green, and the unwanted ingredients can be highlighted by another color, such as red. In another example, a user can create a list of stores to visit in a mall, and then scan a mall directory to easily find those stores on the mall directory and/or a map of the mall. In another example, users could input each medication they are taking. Then, upon scanning medicine information for a new medication, the user could be presented with information associated with any potential interactions.

In one example, a user could input a list of books or authors they want to find. Then, upon scanning book spines along a bookshelf, can easily find their desired books or authors. Users also want to find all phone numbers and/or URLs identified while scanning over text. Further, such a method as discussed above, can be useful for scanning ingredients of a product, identifying allergens, such as nuts, wheat, or milk, without having to read through a large volume of small-printed text. In another scenario, a user can scan a menu at a restaurant, highlighting certain ingredients as desirable, and others as undesirable. For example, a user who likes "chicken", "avocado", and "Swiss cheese", but doesn't like "tomato", "ham", or "cheddar" can choose to highlight the desirable words in green and the undesirable words in red.

In at least one embodiment, upon identifying food items, such as ingredients on a menu, the menu could be augmented with information, such as calorie range, measure of healthiness, or dietary class (vegan, vegetarian, kosher, contains meat, etc.). Further, users may scan either a menu or nutrition facts labels and while, words are highlighted, information for these nutrition facts can be extracted for other functions, such as counting calories, fat, or sugar intake by scanning text information about what a user eats. Accordingly, this information could be integrated with other applications through an Application Programing Interface (API) which could take the notifications of words on the screen and highlight them in custom ways. For example, a company could use Health/Diet functionality described above and integrate their system for custom user interaction and experience through an application downloadable to their computing device.

Additional applications include scanning business cards where groups of relevant text are highlighted and augmented. The text of these groups can include a name, address, email, phone numbers, title, company name, etc. A user could also touch these groups to perform relevant actions, such bring up a phone dialer when a phone number is clicked, for example. Further, users can scan pages of a book to search for relevant names, characters, or other terms. Sentences or paragraphs can also be highlighted, depending on what the user desires, such as if the user is looking for sentences or paragraphs that contain a certain character or name.

In at least one embodiment, users could also pause the live camera view by capturing a single image and interact with the text in a more traditional manner, such as searching for words and phrases, selecting certain regions, or having the text read-aloud. Accordingly, while viewing the text results, users could copy, paste, edit, share, search, translate, or execute other traditional text interactions on the entire text or sub-regions of the text.

Figure 8A:
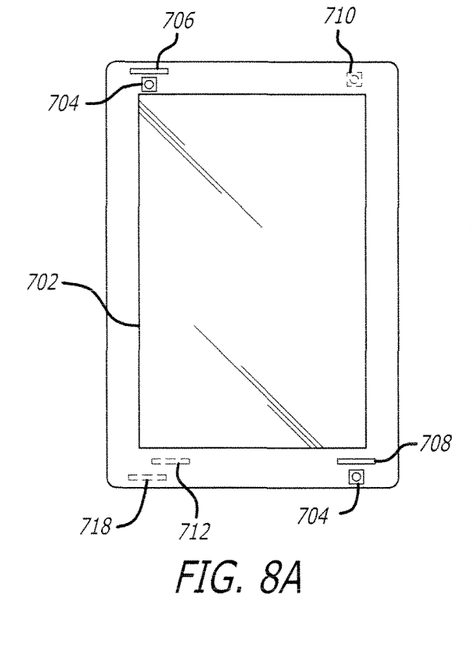
FIGS. 8A and 8B illustrate an example computing device that can be used to implement aspects of various embodiments.
Figure 8B:
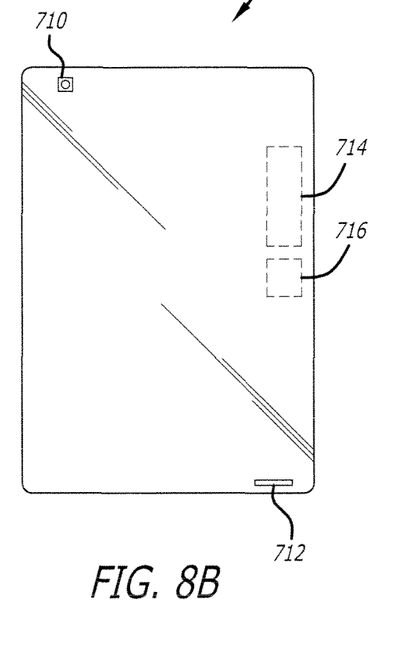

FIGS. 8A and 8B illustrate front and back views, respectively, of an example electronic computing device 800 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 800 has a display screen 802 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 804 on the front of the device and at least one image capture element 810 on the back of the device. It should be understood, however, that image capture elements could also, or alternatively, be placed on the sides or corners of the device, and that there can be any appropriate number of capture elements of similar or different types. Each image capture element 804 and 810 may be, for example, a camera, a charge-coupled device (CCD), a motion detection sensor or an infrared sensor, or other image capturing technology.

As discussed, the device can use the images (e.g., still or video) captured from the imaging elements 804 and 810 to generate a three-dimensional simulation of the surrounding environment (e.g., a virtual reality of the surrounding environment for display on the display element of the device). Further, the device can utilize outputs from at least one of the image capture elements 804 and 810 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as keywords spoken by a user of the device, music being hummed by a person near the device, or audio being generated by a nearby speaker or other such component, although audio elements are not required in at least some devices. In this example there are three microphones, one microphone 808 on the front side, one microphone 812 on the back, and one microphone 806 on or near a top or side of the device. In some devices there may be only one microphone, while in other devices there might be at least one microphone on each side and/or corner of the device, or in other appropriate locations.

The device 800 in this example also includes one or more orientation- or position-determining elements 818 operable to provide information such as a position, direction, motion, or orientation of the device. These elements can include, for example, accelerometers, inertial sensors, electronic gyroscopes, and electronic compasses.

The example device also includes at least one communication mechanism 814, such as may include at least one wired or wireless component operable to communicate with one or more electronic devices. The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

Figure 9:
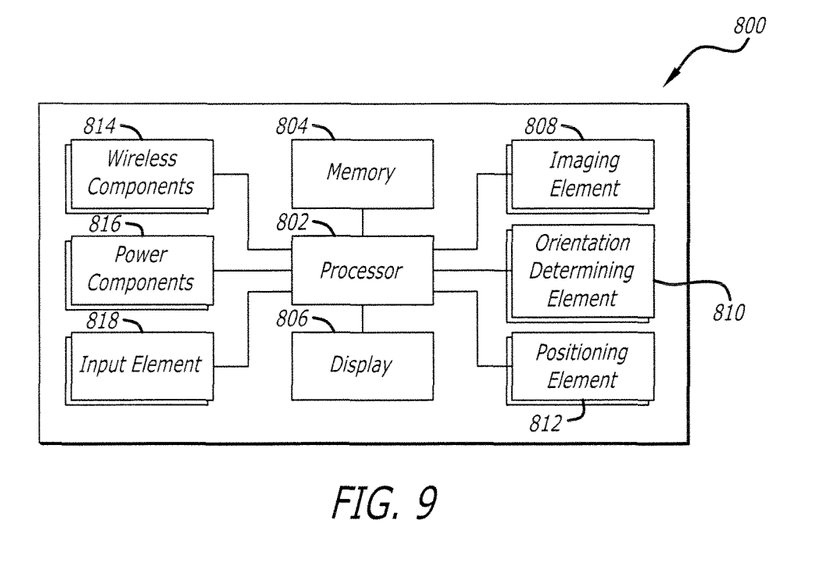
FIG. 9 illustrates example components that can be used with a device such as that illustrated in FIGS. 8A and 8B.

FIG. 9 illustrates a set of basic components of an electronic computing device 900 such as the device 800 described with respect to FIG. 8. In this example, the device includes at least one processing unit 902 for executing instructions that can be stored in a memory device or element 904. As would be apparent to one of ordinary skill in the art, the device can include many types of memory, data storage, or computer-readable media, such as a first data storage for program instructions for execution by the processing unit(s) 902, the same or separate storage can be used for images or data, a removable memory can be available for sharing information with other devices, and any number of communication approaches can be available for sharing with other devices.

The device typically will include some type of display element 906, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 908, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 900 also includes at least one orientation determining element 910 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 900. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 912 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 914 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 916, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 918 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

Figure 10:
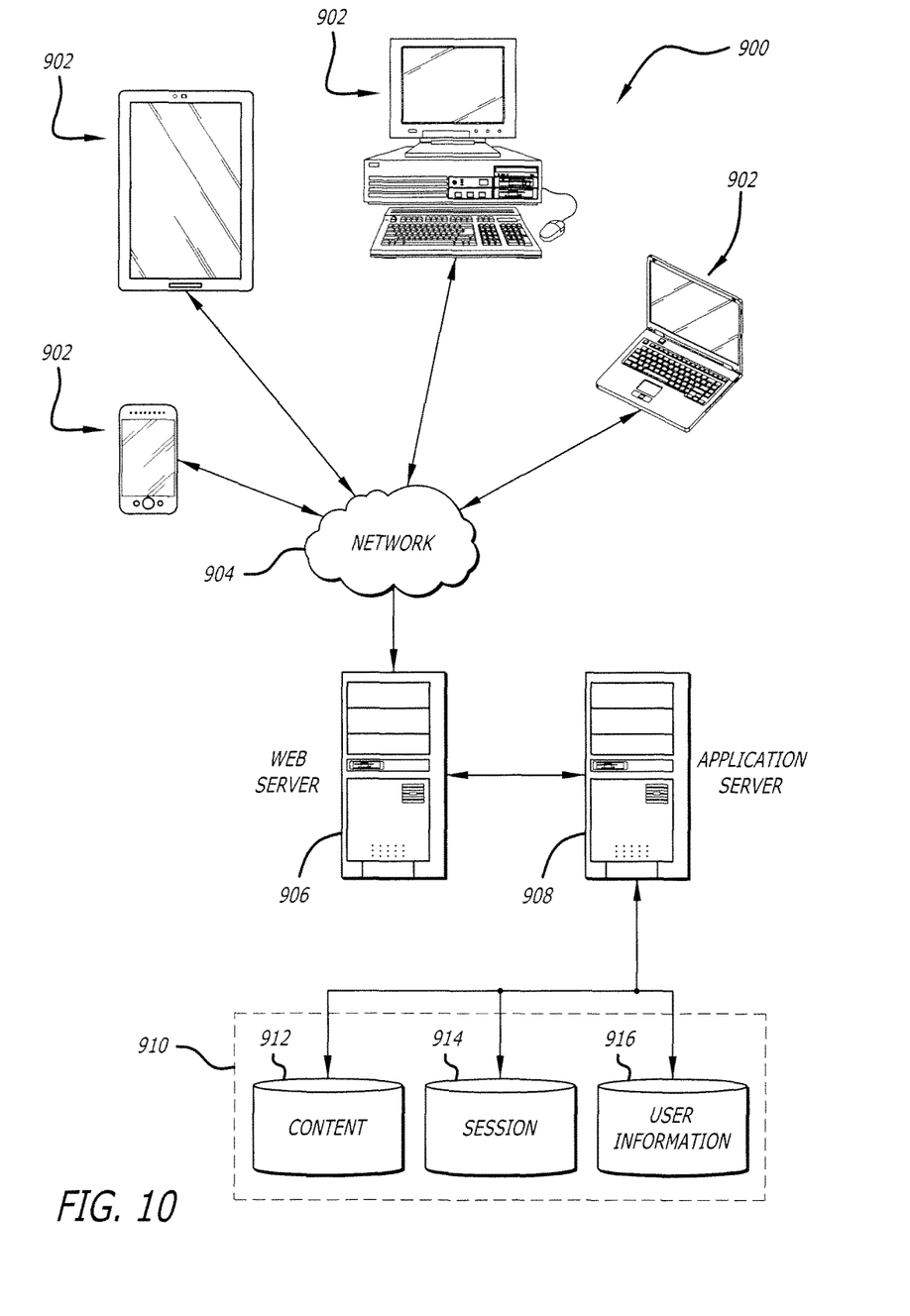
FIG. 10 illustrates an environment in which various embodiments can be implemented.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks. an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed omputing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, contr)ller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media Icnown or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A non-transitory computer-readable storage medium storing instructions that, when executed by at least one processor, cause a computing device to:
   receive a user preference, the user preference selected for an individual user;
   access a user identified word of a plurality of user identified words, the user identified word associated with the user preference and a color selected for the individual user;
   obtain image data that includes a representation of text;
   use an object recognition algorithm to determine a recognized word represented in the image data;
   associate the user identified word with the recognized word;
   display the recognized word emphasized by a visual color attribute, the visual color attribute matching the color associated with the user identified word; and
   arrange the recognized word with respect to a plurality of recognized words, individual recognized words of the plurality of recognized words associated with individual user preferences and individual colors selected for individual users, the plurality of recognized words arranged based on the color, thereby ascertaining a group preference associated with group behavior based on the individual recognized words with respect to the plurality of recognized words.

2. The non-transitory computer-readable storage medium of claim 1, wherein the visual color attribute comprises at least one of a bounding box around the recognized word, a graphical representation of the recognized word in color, or a highlighting of the recognized word with a color.

3. The non-transitory computer-readable storage medium of claim 2, wherein the instructions that, when executed by the at least one processor, further cause the computing device to:
   receive the plurality of user identified words from a user; and
   enable the user to assign a first overlay to a first set of words and a second overlay to a second set of words of the plurality of user identified words.

4. The non-transitory computer-readable storage medium of claim 3, wherein the first overlay is different in appearance relative to the second overlay.

5. The non-transitory computer-readable storage medium of claim 1, wherein an overlay associated with each occurrence of the recognized word moves in corresponding motion with at least one word of the representation of text on a display element in a live field of view of a camera.

6. The non-transitory computer-readable storage medium of claim 1, wherein the instructions that, when executed by the at least one processor, further cause the computing device to:
   identify a category associated with the recognized word; and
   apply, based at least in part on the identified category, a list of one or more user identified words.

7. A computer-implemented method, comprising:
   receiving a user preference, the user preference selected for an individual user;
   accessing a user identified word of a plurality of user identified words, the user identified word associated with user preference and a color selected for the individual user;
   obtaining image data that includes a representation of text;
   using an object recognition algorithm to determine a recognized word represented in the image data;
   associating the user identified word with the recognized word;
   displaying the recognized word emphasized by a visual color attribute, the visual color attribute matching the color associated with the user identified word; and
   arranging the recognized word with respect to a plurality of recognized words, individual recognized words of the plurality of recognized words associated with individual user preferences and individual colors selected for individual users, the plurality of recognized words arranged based on the color, thereby ascertaining a group preference associated with group behavior based on the individual recognized words with respect to the plurality of recognized words.

8. The computer-implemented method of claim 7, wherein the image data is obtained by a camera, and wherein the image data is displayed on a display element as at least one of a live field of view of the camera or a real-time video captured by the camera.

9. The computer-implemented method of claim 8, wherein the visual color attribute comprises displaying at least one of a bounding box around the recognized word, or displaying a graphical representation of the recognized word.

10. The computer-implemented method of claim 8, wherein the visual color attribute comprises displaying a graphical overlay at least one of above or adjacent the recognized word.

11. The computer-implemented method of claim 10, wherein the graphical overlay moves in corresponding motion with the recognized word on the display element in the live field of view of the camera.

12. The computer-implemented method of claim 10, wherein the graphical overlay includes an additional visual attribute operable to cause the recognized word to be emphasized relative to a remainder of words of the representation of text displayed on the display element.

13. The computer-implemented method of claim 10, wherein the graphical overlay further comprises at least one of a bounding box around the recognized word, a graphical representation of the recognized word in color, or color highlighting.

14. The computer-implemented method of claim 10, further comprising:
   receiving the plurality of user identified words from a user; and
   enabling the user to assign an overlay to individual ones of the plurality of user identified words.

15. The computer-implemented method of claim 7, further comprising:
   identifying a category associated with the recognized word; and
   applying a list of user identified words based at least in part on the identified category.

16. A computing device, comprising:
   a processor;
   a camera;
   a display screen; and
   memory including instructions that, when executed by the processor, cause the computing device to:
   receive a user preference associated with behavior of an individual user;
   access a user identified word of a plurality of user identified words, the user identified word associated with the user preference and a color selected for the individual user;
   obtain image data that includes a representation of text;
   use an object recognition algorithm to determine a recognized word represented in the image data;
   associated the user identified word with the recognized word;
   display associated with the recognized word a visual color attribute, the visual color attribute matching the color associated with the user identified word; and
   arrange the recognized word with respect to a plurality of recognized words, individual recognized words of the plurality of recognized words associated with individual user preferences and individual colors selected for individual users, the plurality of recognized words arranged based on the color, thereby ascertaining a group preference associated with group behavior based on the individual recognized words with respect to the plurality of recognized words.

17. The computing device of claim 16, wherein the instructions, when executed by the processor, further enable the computing device to:
   identify a category associated with the recognized word; and
   determine a user identified word list based at least in part on the identified category.

18. The computing device of claim 16, wherein the visual color attribute comprises displaying at least one of a bounding box around the recognized word, displaying a graphical representation of the recognized word, or color highlighting.

19. The computing device of claim 16, wherein the visual color attribute comprises displaying a graphical overlay above or adjacent to the recognized word.

20. The computing device of claim 19, wherein the graphical overlay above or adjacent the recognized word moves in corresponding motion with the recognized word on the display screen in a live field of view of the camera.

* * * * *